United States Patent
Gambhir-Parekh (10) Patent No.: US 12,075,497 B2
(45) Date of Patent: *Aug. 27, 2024

(54) MULTI-UE AND MULTI-MESSAGE SUPPORT IN TUNNEL MANAGEMENT MESSAGES

(71) Applicant: Parallel Wireless, Inc., Nashua, NH (US)

(72) Inventor: Manisha Sameer Gambhir-Parekh, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,539

(22) Filed: Oct. 18, 2022

(65) Prior Publication Data
US 2023/0041028 A1 Feb. 9, 2023

Related U.S. Application Data

(63) Continuation of application No. 16/820,387, filed on Mar. 16, 2020, now Pat. No. 11,477,828.

(60) Provisional application No. 62/819,420, filed on Mar. 15, 2019.

(51) Int. Cl.
*H04W 76/12* (2018.01)
*H04W 28/06* (2009.01)
*H04W 80/06* (2009.01)

(52) U.S. Cl.
CPC .......... *H04W 76/12* (2018.02); *H04W 28/06* (2013.01); *H04W 80/06* (2013.01)

(58) Field of Classification Search
None
See application file for complete search history.

(56) References Cited

U.S. PATENT DOCUMENTS

| | | | |
|---|---|---|---|
| 2013/0201845 A1* | 8/2013 | Cortes Gomez | H04W 48/17 370/252 |
| 2014/0226646 A1* | 8/2014 | Nishigori | H04W 8/10 370/338 |
| 2019/0215302 A1* | 7/2019 | Chandramouli | H04L 12/66 |
| 2020/0267623 A1* | 8/2020 | Altay | H04L 45/64 |

* cited by examiner

*Primary Examiner* — German Viana Di Prisco
(74) *Attorney, Agent, or Firm* — Michael Y. Saji (57) ABSTRACT

Systems, methods and computer software are disclosed for providing multi-User Equipment (UE) and multi-message support in tunnel management messages. In one embodiment, a method is disclosed, comprising: determining, for a first node and a second node using GPRS Tunneling Protocol (GTP) tunneling support for UE management, if the first node and the second node support multi-UE messaging; when the first node and the second node support multi-UE messaging, then switching to multi-UE multi-messaging mode wherein a chain of messages are formed; and when at least one of the first node and second node do not support multi-UE messaging, then using conventional tunnel management messaging.

15 Claims, 6 Drawing Sheets

MULTI-UE AND MULTI-MESSAGE SUPPORT IN TUNNEL MANAGEMENT MESSAGES

CROSS-REFERENCE TO RELATED APPLICATIONS

This application is a continuation of U.S. application Ser. No. 16/820,387, filed Mar. 16, 2020, which claims priority under 35 U.S.C. § 119(e) to U.S. Provisional Pat. App. No. 62/819,420, filed Mar. 15, 2019, titled "Multi-UE and Multi-Message Support in Tunnel Management Messages", each of which is hereby incorporated by reference in its entirety for all purposes. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014; U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

Existing Tunnel management messages are defined by 3GPP spec 29.274 include:
1. Create Session Request and Create Session Response.
2. Delete Session Request and Delete Session Response.
3. Create Bearer Request and Create Bearer Response.
4. Modify Bearer Request and Modify Bearer Response.
5. Delete Bearer Request and Delete Bearer Response.

The existing specification deals with single UE. At HNG, MME, SGW, PGW, SGSN, GGSN, etc., there are frequent session/bearer creation, modification or deletion. GTP-C message is embedded in UDP packet. Each GTP-C message processing results in processing of L4, L3 and L2 protocols. Significant amount of processing cycles are utilized in processing L2, L3 and L4 layers. If these cycles are saved, it will result in higher connections per second (CPS) or tunnels per second (TPS) or transactions between the two GTP peers talking to each other.

SUMMARY

A method, system and software are disclosed to enhance Tunnel management messages, to create and delete sessions, create, modify and delete bearers, to address multiple UEs on multiple services such as LTE, 3G, ePDG, TWANGW, PCRF. The method, system and software also disclose enhancements in Tunnel management messages to support multiple request and response messages of same or multiple UEs. This will help in optimizing the bandwidth on control plane and improving the performance at respective nodes by reducing the processing time for group of UEs.

In one embodiment, a method may be disclosed for multi-User Equipment (UE) and multi-message support in tunnel management messages. The method may include determining, for a first node and a second node using GPRS Tunneling Protocol (GTP) tunneling support for UE management, if the first node and the second node support multi-UE messaging; when the first node and the second node support multi-UE messaging, then switching to multi-UE multi-messaging mode wherein a chain of messages are formed; and when at least one of the first node and second node do not support multi-UE messaging, then using conventional tunnel management messaging.

In another embodiment, a system for providing multi-User Equipment (UE) and multi-message support in tunnel management messages includes a first node; a second node in communication with the first node; wherein one of the first node and the second node use GPRS Tunneling Protocol (GTP) tunneling support for UE management, and determine if the first node and the second node support multi-UE messaging; when the first node and the second node support multi-UE messaging, then switching to multi-UE multi-messaging mode wherein a chain of messages are formed; and when at least one of the first node and second node do not support multi-UE messaging, then using conventional tunnel management messaging.

In another embodiment, a non-transitory computer-readable medium contains instructions for providing multi-User Equipment (UE) and multi-message support in tunnel management messages which, when executed, cause one of a first node or a second node to perform steps including determining, for a first node and a second node using GPRS Tunneling Protocol (GTP) tunneling support for UE management, if the first node and the second node support multi-UE messaging; when the first node and the second node support multi-UE messaging, then switching to multi-UE multi-messaging mode wherein a chain of messages are formed; and when at least one of the first node and second node do not support multi-UE messaging, then using conventional tunnel management messaging.

DETAILED DESCRIPTION

Figure 1:
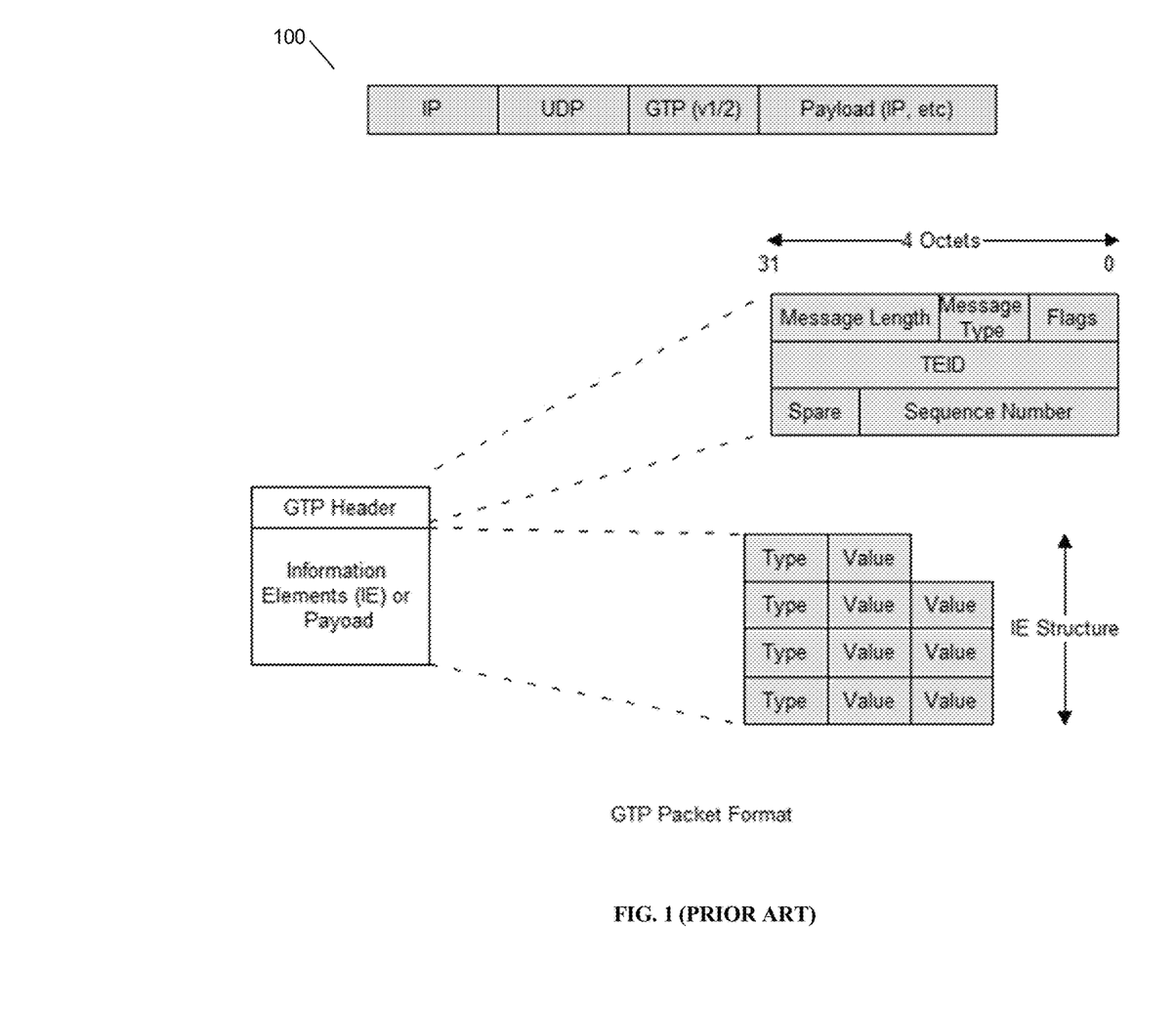
FIG. 1 is a prior art diagram showing GTP packet format.

FIG. 1 is a diagram of a conventional GTP packet format 100.

These GTP-C messages address single UE request/response. The last Information Element in these messages is Private Extension IE. The Private Extension IE contain vendor/operator specific information.

In one embodiment the octets are defined as follows.

Octet 1 is a type field. Octets 2-3 are a length field. Octet 4 is a spare field and an instance field. Octets 5-6 are an enterprise ID field. Octet 7-(n+4) are a proprietary field.

Figure 2:
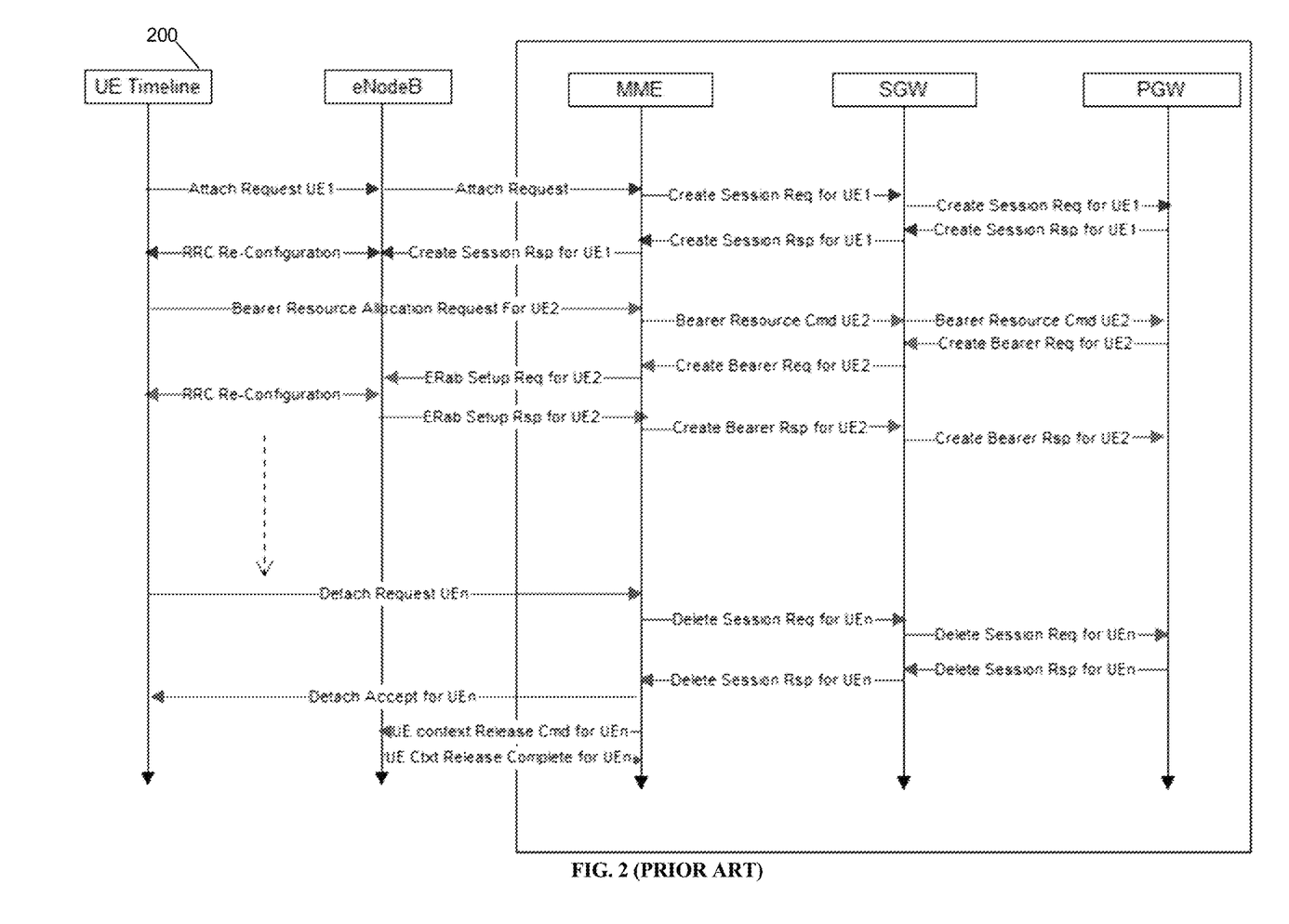
FIG. 2 is a prior art diagram showing conventional tunnel messaging.

FIG. 2 is a diagram of a conventional tunnel messaging flow 200, and depicts the traditional Tunnel Messaging for multiple UEs.

If there is a way to embedded more than one CSR/MBR, Responses to CSR/CBR, etc. in a message, we can save on L4, L3 and L2 processing for a set of UEs.

The Private Extension IE in all the messages contain vendor/operation specific information. If a company has Enterprise ID registered with IANA, we can extend the existing message into adding more messages for different UEs. The Proprietary Value, element can be overloaded to add additional Tunnel messages for different UEs. If for example, Parallel Wireless specific Private Extension IE is present, the Proprietary Value will be overload with information about next message in the packet. This message may start with GTP header containing another UE tunnel messages. Thus a chain of messages can be formed. If there are no more messages in the list, the absence of Proprietary Value or certain value in Proprietary Value IE of the last message will indicate the same. The number of messages that can be pushed into the existing packet depends on space available in the existing packet (which is dependent on MTU of the path between the peers) and number of IEs to be inserted in the messages for next UE.

Batching of messages increases performance of a node, makes optimal use of resources. And efficient link between the two GTP nodes managing the UEs. Thus saving on most part of the stack processing for a group of UEs.

The Node which implements multi-UE/message support in Tunnel management messages, shall send first Tunnel management message with Proprietary IE. If the peer node supports the Multi-UE/message support, it will respond the tunnel management message with Proprietary IE. Once both the nodes are aware of Multi-UE/messaging support, the nodes can switch to Multi-UE/multi-messaging mode. Else the requesting node can fall back upon the traditional mechanism of Tunnel management messages.

Figure 3:
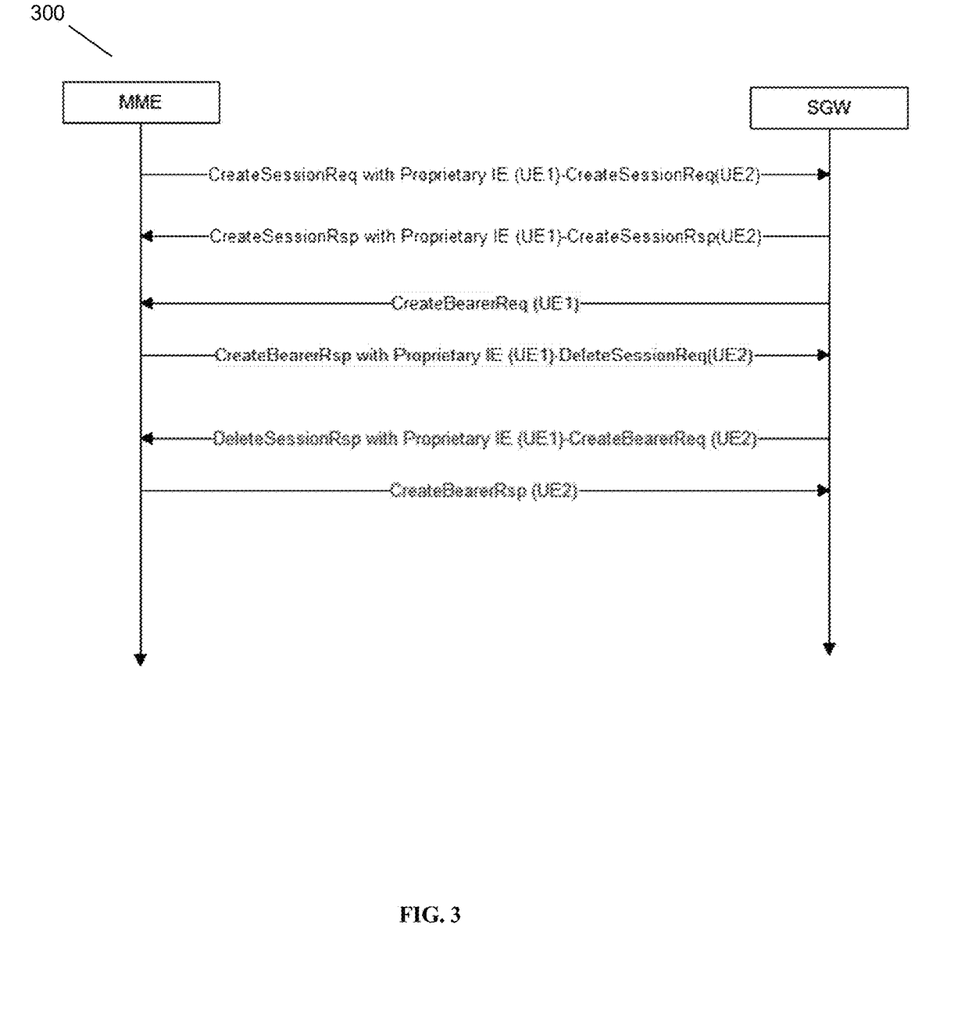
FIG. 3 is a diagram showing tunnel messaging, in accordance with some embodiments.

FIG. 3 is a diagram 300 of tunneling messaging which provides multi-UE and multi-message support in tunnel management messages. Diagram 300 depicts the proposed GTP tunnel messaging. For illustration purpose, the diagram depicts messaging between MME and SGW. The proposed idea can be applied between any node that used GTP tunneling messages for UE management for example PGW, PCRF, SGSN, GGSN, ePDG, TWANGW, etc.

Figure 4:
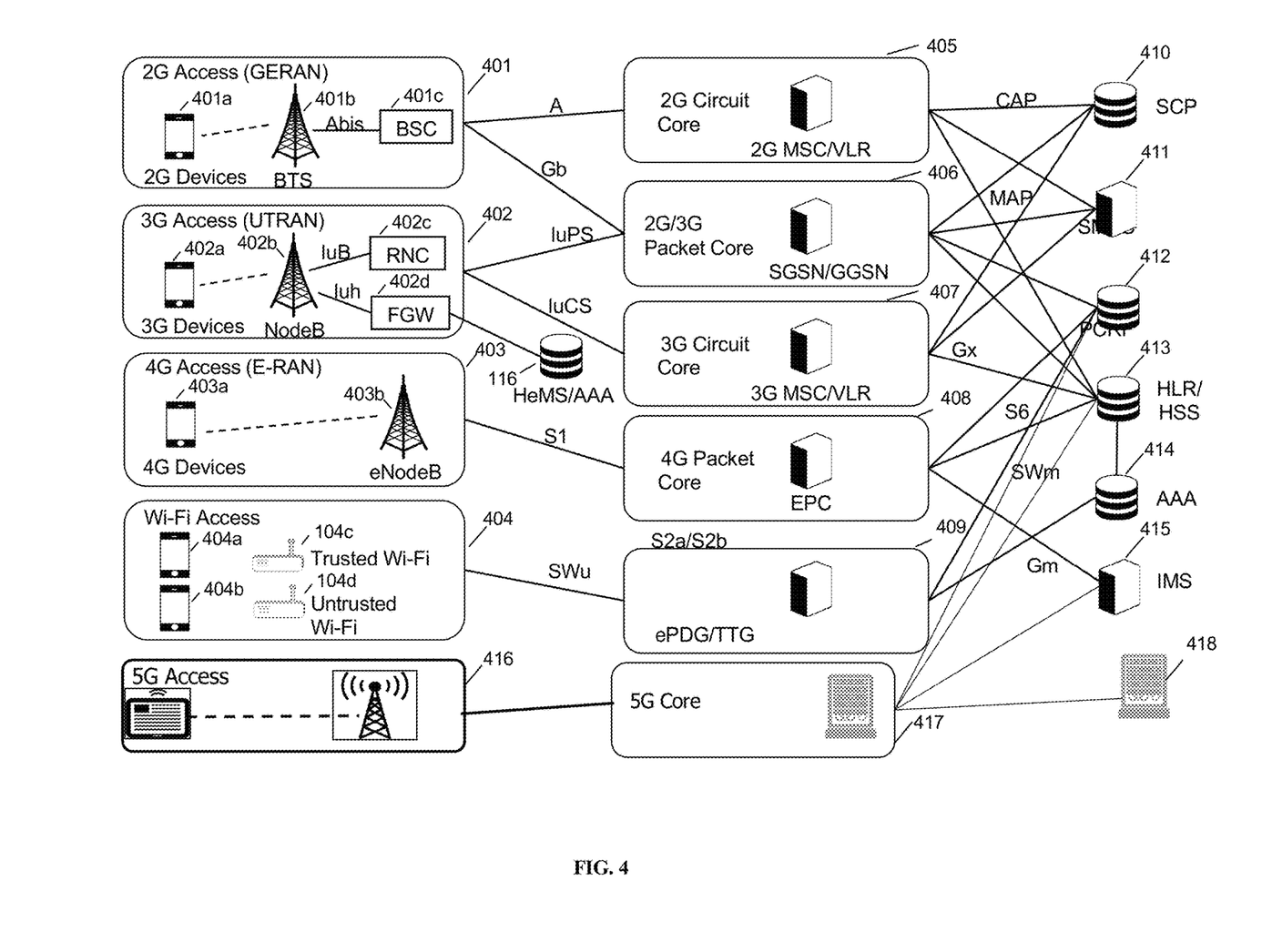
FIG. 4 is a schematic network architecture diagram for 3G and other-G prior art networks.

FIG. 4 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 401a, BTS 401b, and BSC 401c. 3G is represented by UTRAN 402, which includes a 3G UE 402a, nodeB 402b, RNC 402c, and femto gateway (FGW, which in 3GPP namespace is also known as a Home nodeB Gateway or HNBGW) 402d. 4G is represented by EUTRAN or E-RAN 403, which includes an LTE UE 403a and LTE eNodeB 403b. Wi-Fi is represented by Wi-Fi access network 404, which includes a trusted Wi-Fi access point 404c and an untrusted Wi-Fi access point 404d. The Wi-Fi devices 404a and 404b may access either AP 404c or 404d. In the current network architecture, each "G" has a core network. 2G circuit core network 405 includes a 2G MSC/VLR; 2G/3G packet core network 406 includes an SGSN/GGSN (for EDGE or UMTS packet traffic); 3G circuit core 407 includes a 3G MSC/VLR; 4G circuit core 408 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 430, the SMSC 431, PCRF 432, HLR/HSS 433, Authentication, Authorization, and Accounting server (AAA) 434, and IP Multimedia Subsystem (IMS) 435. An HeMS/AAA 436 is present in some cases for use by the 3G UTRAN. The diagram is used to indicate schematically the basic functions of each network as known to one of skill in the art, and is not intended to be exhaustive. For example, 5G core 417 is shown using a single interface to 5G access 416, although in some cases 5G access can be supported using dual connectivity or via a non-standalone deployment architecture.

Noteworthy is that the RANs 401, 402, 403, 404 and 436 rely on specialized core networks 405, 406, 407, 408, 409, 437 but share essential management databases 430, 431, 432, 433, 434, 435, 438. More specifically, for the 2G GERAN, a BSC 401c is required for Abis compatibility with BTS 401b, while for the 3G UTRAN, an RNC 402c is required for Iub compatibility and an FGW 402d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 5:
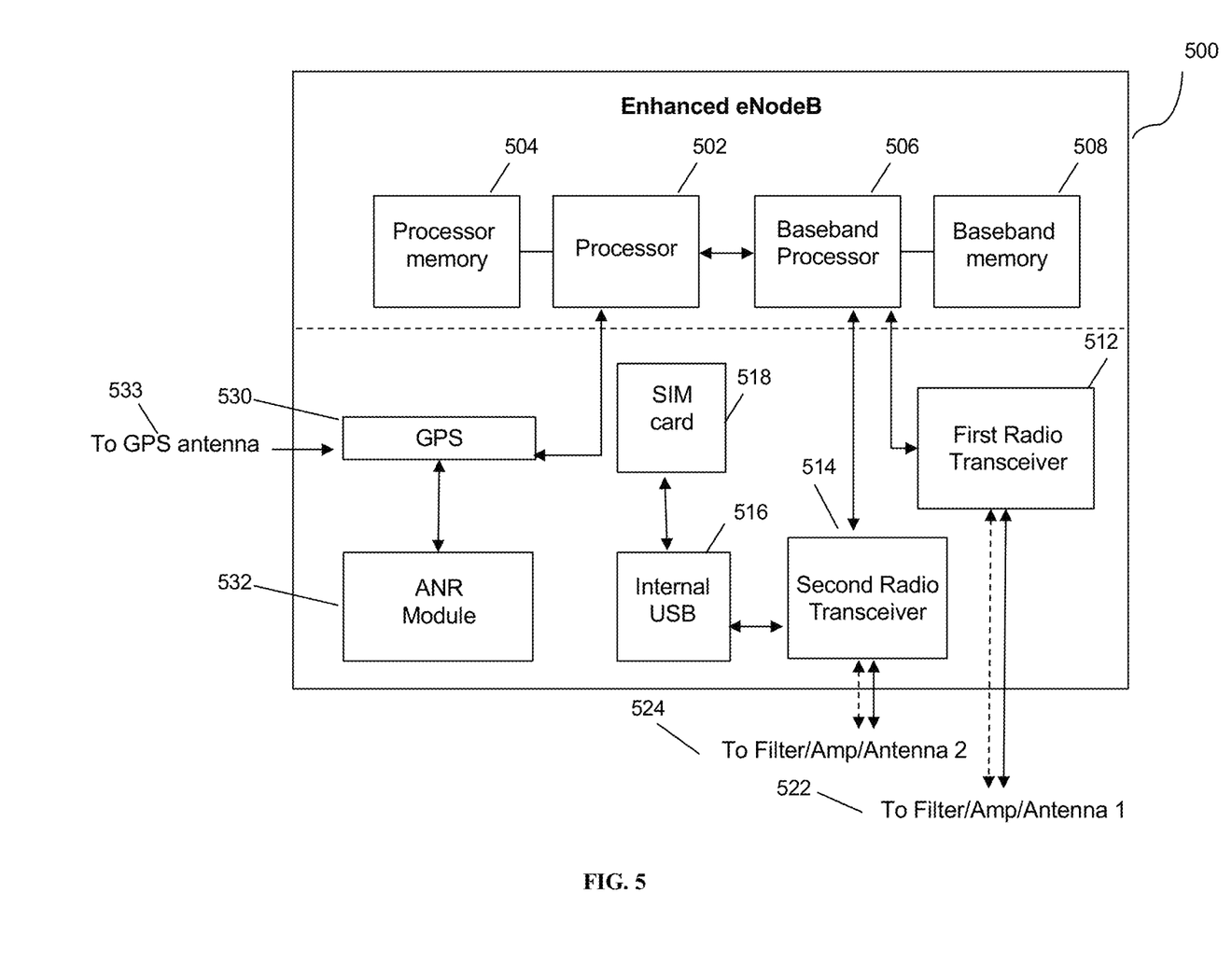
FIG. 5 is an enhanced eNodeB for performing the methods described herein, in accordance with some embodiments.

FIG. 5 is an enhanced eNodeB for performing the methods described herein, in accordance with some embodiments. Mesh network node 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 6:
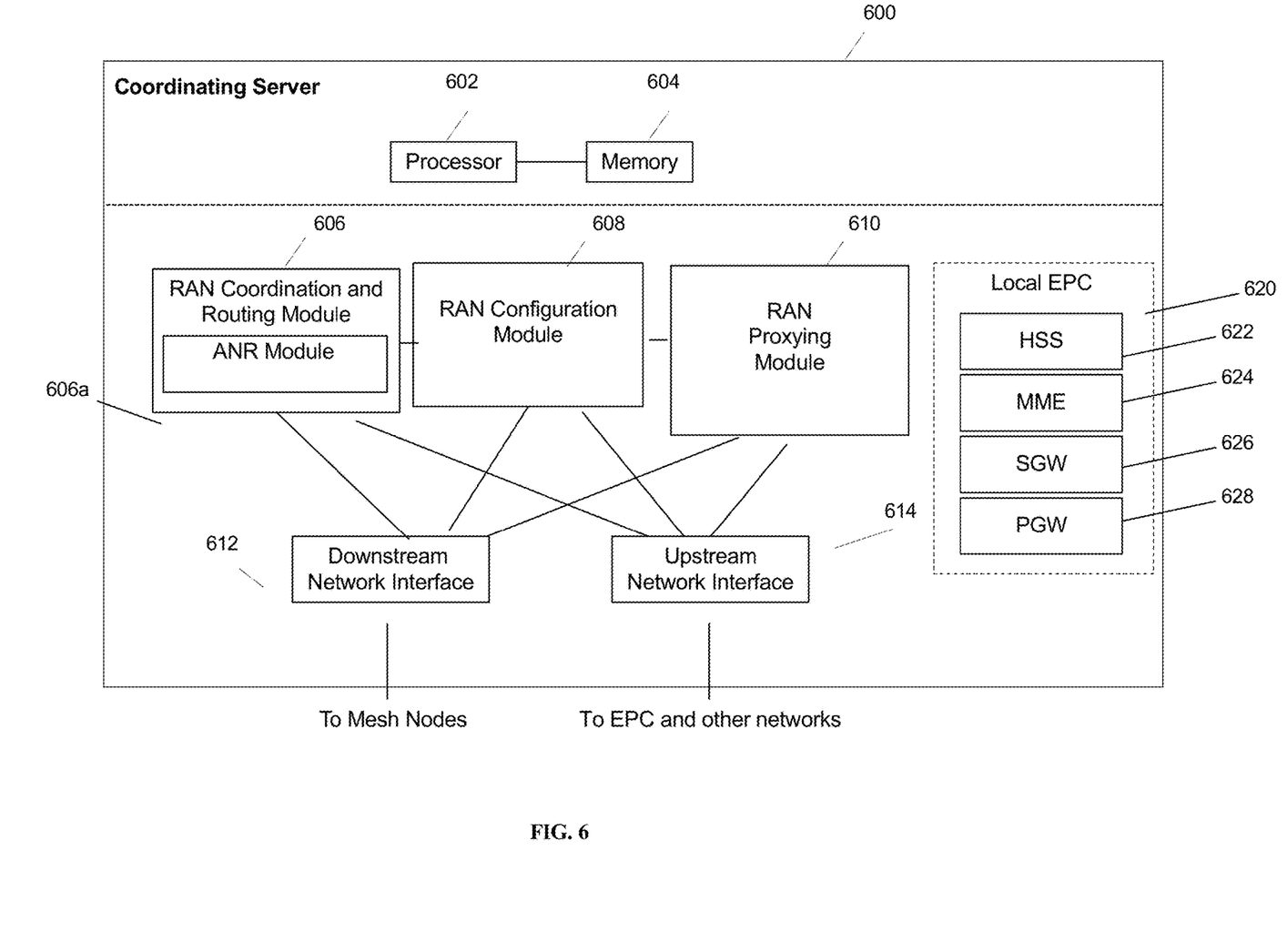
FIG. 6 is a coordinating server for providing services and performing methods as described herein, in accordance with some embodiments.

FIG. 6 is a coordinating server for providing services and performing methods as described herein, in accordance with some embodiments. Coordinating server 600 includes processor 602 and memory 604, which are configured to provide the functions described herein. Also present are radio access network coordination/routing (RAN Coordination and routing) module 606, including ANR module 606a, RAN configuration module 608, and RAN proxying module 610. The ANR module 606a may perform the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine one of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G legacy TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for multi-User Equipment (UE) and multi-message support in tunnel management messages, comprising:
    determining, for a first node and a second node using GPRS Tunneling Protocol (GTP) tunneling support for UE management, if the first node and the second node support multi-UE messaging; and
    when the first node and the second node support multi-UE messaging, then switching to multi-UE multi-messaging mode wherein a chain of messages are formed,
    wherein sending a multi-UE multi-messaging mode message includes overloading an element of a GTP tunnel message by adding additional messages for different UEs.

2. The method of claim 1, wherein sending a multi-UE multi-messaging mode message includes overloading a Proprietary Value element of a GTP tunnel message by adding additional messages for different UEs.

3. The method of claim 2, wherein a sending a multi-UE multi-messaging mode message includes sending a multi-UE multi-messaging mode message with a GTP header containing another UE tunnel message.

4. The method of claim 1, further comprising sending multi-UE multi-messaging mode message without a proprietary value in the proprietary value element to indicate there are no more messages to be sent.

5. The method of claim 1, wherein the first node comprises one of a Mobility Management Entity (MME), a Serving Gateway (SGW), a 5G Non-Standalone core node, or a 5G Standalone core node.

6. A system for providing multi-User Equipment (UE) and multi-message support in tunnel management messages, comprising:
a first node; and
a second node in communication with the first node;
wherein one of the first node and the second node use GPRS Tunneling Protocol (GTP) tunneling support for UE management, and determine if the first node and the second node support multi-UE messaging; and
when the first node and the second node support multi-UE messaging, then switching to multi-UE multi-messaging mode wherein a chain of messages are formed,
wherein sending a multi-UE multi-messaging mode message includes overloading an element of a GTP tunnel message by adding additional messages for different UEs.

7. The system of claim 6, wherein a multi-UE multi-messaging mode message includes an overloaded a Proprietary Value element of a GTP tunnel message having additional messages for different UEs added thereto.

8. The system of claim 7, wherein a multi-UE multi-messaging mode message includes a GTP header containing another UE tunnel message.

9. The system of claim 6, wherein a multi-UE multi-messaging mode message without a proprietary value in the proprietary value element indicates there are no more messages to be sent.

10. The system of claim 6, wherein the first node comprises one of a Mobility Management Entity (MME), a Serving Gateway (SGW), a 5G Non-Standalone core node, or a 5G Standalone core node.

11. A non-transitory computer-readable medium comprising instructions for providing multi-User Equipment (UE) and multi-message support in tunnel management messages which, when executed, cause one of a first node or a second node to perform steps comprising:
determining, for a first node and a second node using GPRS Tunneling Protocol (GTP) tunneling support for UE management, if the first node and the second node support multi-UE messaging; and
when the first node and the second node support multi-UE messaging, then switching to multi-UE multi-messaging mode wherein a chain of messages are formed,
wherein sending a multi-UE multi-messaging mode message includes overloading an element of a GTP tunnel message by adding additional messages for different UEs.

12. The computer-readable medium of claim 11, further comprising instructions wherein sending a multi-UE multi-messaging mode message includes overloading a Proprietary Value element of a GTP tunnel message by adding additional messages for different UEs.

13. The computer-readable medium of claim 12, further comprising instructions wherein sending a multi-UE multi-messaging mode message includes sending a multi-UE multi-messaging mode message with a GTP header containing another UE tunnel message.

14. The computer-readable medium of claim 11, further comprising instructions wherein sending multi-UE multi-messaging mode message without a proprietary value in the proprietary value element to indicate there are no more messages to be sent.

15. The computer-readable medium of claim 11, further comprising instructions wherein the first node comprises one of a Mobility Management Entity (MME), a Serving Gateway (SGW), a 5G Non-Standalone core node, or a 5G Standalone core node.

* * * * *